(12) United States Patent
Gustafson

(10) Patent No.: US 10,332,684 B2
(45) Date of Patent: Jun. 25, 2019

(54) METHODS AND SYSTEMS FOR MATERIAL CLADDING OF MULTILAYER CERAMIC CAPACITORS

(71) Applicant: VQ RESEARCH, INC., Palo Alto, CA (US)

(72) Inventor: John L. Gustafson, Santa Clara, CA (US)

(73) Assignee: VQ RESEARCH, INC., Palo Alto, CA (US)

( * ) Notice: Subject to any disclaimer, the term of this patent is extended or adjusted under 35 U.S.C. 154(b) by 59 days.

(21) Appl. No.: 15/273,703

(22) Filed: Sep. 23, 2016

(65) Prior Publication Data

US 2017/0018366 A1   Jan. 19, 2017

Related U.S. Application Data

(63) Continuation-in-part of application No. 15/212,297, filed on Jul. 18, 2016, now Pat. No. 10,128,047, and a continuation-in-part of application No. 15/250,993, filed on Aug. 30, 2016, now Pat. No. 10,242,803.

(60) Provisional application No. 62/194,256, filed on Jul. 19, 2015, provisional application No. 62/211,792, filed on Aug. 30, 2015, provisional application No. 62/232,419, filed on Sep. 24, 2015, provisional (Continued)

(51) Int. Cl.
| | |
|---|---|
| *H01G 4/30* | (2006.01) |
| *H01G 4/12* | (2006.01) |
| *H01G 4/232* | (2006.01) |
| *H01G 4/008* | (2006.01) |
| *H01G 4/012* | (2006.01) |

(52) U.S. Cl.
CPC .............. *H01G 4/30* (2013.01); *H01G 4/0085* (2013.01); *H01G 4/012* (2013.01); *H01G 4/1227* (2013.01); *H01G 4/232* (2013.01)

(58) Field of Classification Search
CPC .......... H01G 4/005; H01G 4/012; H01G 4/12; H01G 4/30; H01G 4/228; H01G 4/1227; H01G 4/232; H01G 4/248
See application file for complete search history.

(56) References Cited

U.S. PATENT DOCUMENTS

| | | |
|---|---|---|
| 2,816,054 A | 12/1957 | Howden |
| 3,115,581 A | 12/1963 | Kilby |
| | (Continued) | |

*Primary Examiner* — Nguyen T Ha
(74) *Attorney, Agent, or Firm* — Ricky Lam

(57) ABSTRACT

Methods and systems to improve a multilayer ceramic capacitor using additive manufacturing are disclosed. Conductive layers and termination caps comprising a base metal may be cladded with a noble metal to lower costs without the tendency of base metal atoms combining with oxygen atoms in the dielectric material as the base metal does not physically contact the dielectric material. The conductive layers may comprise a wavy shape, and may comprise conductive layer ends modified to minimize or eliminate sharp edges and corners, such as comprising a convex, wavy, or bulbous shape. The noble metal portion of a conductive layer may be a minimum thickness required to prevent chemical reactions between the base metal portion and the dielectric material. In conjunction with computer modeling of Laplace's equation, the conductors can be reshaped at little material cost to make the electric field nearly uniform through adjustments of the base metal portion.

2 Claims, 16 Drawing Sheets

Related U.S. Application Data application No. 62/266,618, filed on Dec. 13, 2015, provisional application No. 62/279,649, filed on Jan. 15, 2016.

(56) References Cited

U.S. PATENT DOCUMENTS

| | | | |
|---|---|---|---|
| 3,775,838 A | 12/1973 | Dalmasso | |
| 3,864,817 A | 2/1975 | Lapham | |
| 4,868,711 A * | 9/1989 | Hirama | H01G 4/20 361/321.3 |
| 5,697,043 A | 12/1997 | Baskaran | |
| 5,796,572 A * | 8/1998 | Kawai | H01G 4/08 257/295 |
| 5,888,329 A | 3/1999 | Cho | |
| 6,141,040 A | 10/2000 | Toh | |
| 6,365,480 B1 | 4/2002 | Huppert | |
| 6,365,960 B1 | 4/2002 | Pollock | |
| 6,621,011 B1 * | 9/2003 | Daidai | H01C 1/034 174/258 |
| 7,199,016 B2 | 4/2007 | Heston | |
| 7,244,999 B2 * | 7/2007 | Aihara | H01G 4/008 257/306 |
| 7,495,891 B2 | 2/2009 | Lee | |
| 7,667,302 B1 | 2/2010 | Chang | |
| 7,766,641 B2 | 8/2010 | Silverbrook | |
| 8,054,608 B2 | 11/2011 | Yoon | |
| 8,102,640 B2 * | 1/2012 | Ogawa | H01G 4/005 361/306.3 |
| 8,154,849 B2 * | 4/2012 | Kunishi | C25D 3/12 361/306.3 |
| 8,163,077 B2 | 4/2012 | Eron | |
| 8,193,532 B2 | 6/2012 | Arai | |
| 8,581,381 B2 | 11/2013 | Zhao | |
| 2001/0006449 A1 * | 7/2001 | Chazono | H01G 4/30 361/306.3 |
| 2001/0012561 A1 * | 8/2001 | Chazono | B32B 19/04 428/325 |
| 2001/0017420 A1 * | 8/2001 | Iwao | H01F 17/0013 257/758 |
| 2002/0006023 A1 * | 1/2002 | Maegawa | H01G 4/232 361/305 |
| 2006/0145401 A1 * | 7/2006 | Mihara | H01C 1/148 264/618 |
| 2010/0289128 A1 | 10/2010 | Camacho | |
| 2013/0114182 A1 | 5/2013 | Suh | |

\* cited by examiner

METHODS AND SYSTEMS FOR MATERIAL CLADDING OF MULTILAYER CERAMIC CAPACITORS

CLAIMS OF PRIORITY

This patent application is a continuation-in-part and claims priority from:
(1) U.S. utility patent application Ser. No. 15/212,297, titled 'Methods and systems for increasing surface area of multi-layer ceramic capacitors' filed on Jul. 18, 2016, which is a continuation-in-part of U.S. provisional patent application No. 62/194,256, titled 'Methods and systems for increasing capacitance of multi-layer ceramic capacitors', filed on Jul. 19, 2015.
(2) U.S. utility patent application Ser. No. 15/250,993, titled 'Methods and systems for geometric optimization of multi-layer ceramic capacitors' filed on Aug. 30, 2016, which is a continuation-in-part of U.S. provisional patent application No. 62/211,792, titled 'Methods and systems for geometric optimization of multi-layer ceramic capacitors', filed Aug. 30, 2015.
(3) U.S. provisional patent application No. 62/232,419, titled 'Methods and systems for material cladding of multi-layer ceramic capacitors', filed Sep. 24, 2015.
(4) U.S. provisional patent application No. 62/266,618, titled 'Methods and systems to improve printed electrical components and for integration in circuits', filed Dec. 13, 2015.
(5) U.S. provisional patent application No. 62/279,649, 'Methods and systems to minimize delamination of multi-layer ceramic capacitors', filed Jan. 15, 2016.

FIELD OF TECHNOLOGY

This disclosure relates generally to forming a novel structure of multilayer ceramic capacitors (MLCC) using the technique of drop-on-demand additive printing to deposit droplets of deposition material.

BACKGROUND

Density is a much-sought advantage in electronic components. If specifications can be maintained while reducing the size of a component, devices made from those components can be made using less material (reducing cost and weight) while also reducing bulk. Or, a component can be given enhanced specifications with the same amount of material, if that leads to superior devices. While transistor density has increased dramatically for decades, improvements in "passive" components such as capacitors have not kept pace.

Multilayer ceramic capacitors, or MLCCs, have traditionally been made by forming a tape from insulating ceramic slurry, printing conductive ink layers, and then pressing the layers together and sintering to form a laminated alternation of insulator (dielectric) and conductor. Particularly in the case of a physically large capacitor, there is a possibility of delamination under the stress of temperature or pressure. If a layer separates, even slightly, there is a drop in the capacitance that can render it out of specification, or there can be complete device failure. In addition, the process may be limited to simple flat layers and complex shapes may not be possible.

The goal, therefore, is to find a way to increase both the capacitance and the maximum voltage for a given form factor. As such, there is a need for a technique that is better equipped to optimize geometrical features to increase specifications of an MLCC.

SUMMARY

Disclosed are methods and systems for material cladding of multilayer ceramic capacitors (MLCCs), specifically, noble metal cladding of base metals in conductive layers. As disclosed herein, the cost of production, product life-time, and product efficiency can be optimized through 3D-printable geometry.

In one aspect, the present invention discloses a system and a method to improve a ceramic capacitor using additive manufacturing, e.g., 3D Printing, where ink or aerosol jets deposit material such as, e.g., ceramic slurry, conductive ink, ferrite paste, and carbon resistor paste onto a surface. The aforementioned materials can be sintered at high temperatures, and therefore are amenable to integrated manufacture. Compared with traditional methods, this process may be inherently more precise and repeatable, has much higher geometric and spatial resolutions, and produces higher density components with less material waste. In addition, a key advantage for purposes of this invention is that more complex shapes that were not possible before can now be printed, which can be used to improve specification and/or structural integrity of the product.

A typical implementation of an additive manufacturing process begins with defining a three-dimensional geometry of the product using computer-aided design (CAD) software. This CAD data is then processed with software that slices the model into a plurality of thin layers, which are essentially two-dimensional. A physical part is then created by the successive printing of these layers to recreate the desired geometry. This process is repeated until all the layers have been printed. Typically, the resulting part is a "green" part, which may be an unfinished product that can undergo further processing, e.g., sintering. The green part may be dense and substantially non-porous.

In another aspect, the present invention discloses base metal cladded with noble metals for material cost reduction and shape adjustment flexibility of MLCCs. Conductors of a capacitor can be made with expensive noble metals, e.g., silver, palladium, gold, or platinum, which have little affinity for oxygen or nitrogen, or with less expensive base metals, e.g., copper or nickel. Ceramic insulators (dielectric layers) are typically oxides or nitrides such as barium titanate ($BaTiO_3$). If an MLCC made with base metals experiences high temperatures, even briefly—such as when being soldered into a device—the conductors can react chemically with the ceramic and alter the specifications of the capacitor at best or ruin it at worst. Even at room temperatures, base metals will slowly react chemically with the ceramics and shorten the useful lifetime of the capacitor. Since noble metals are many times more expensive than base metals, the choice of conductor material in capacitor design presents a tradeoff between performance (longevity, temperature tolerance) and affordability.

In the present invention, conductive layers can be made with base metals and cladded with noble metals to lower costs without the tendency of base metal atoms combining with oxygen atoms in the dielectric material (which spoils the capacitor, especially if operated at high temperatures). In conjunction with computer modeling of Laplace's equation, the electrodes can be reshaped at little material cost to make the electric field nearly uniform. The present invention reduces the cost of an MLCC without the degradation of performance associated with conductors made entirely of base metals; it further increases the design flexibility, which makes it more practical to use techniques that increase both the capacitance and maximum voltage for a given form factor.

In yet another aspect, the present invention discloses reshaping of conductive layers and termination caps of MLCCs through noble metal cladding of base metals and/or manipulation of base metal layers. In terms of electrostatic behavior, the shape of the conductive layers is much less important than the shape of the dielectric layers. In conductors, electrons exhibit the "skin effect." Like charges repel, so the electrons seek the maximum distance from one another as they travel in a conductor; this leads them to cling to the outermost border of a conductive shape. In a conductor, the electrostatic potential at the surface is constant, no matter the shape. The reshaping and/or cladding of conductive layers and termination caps of MLCCs can be done using inexpensive base metals, instead of requiring noble metals to establish rounded interior corners and other modifications.

In yet another aspect, the present invention discloses a system and a method for optimizing geometry of a multi-layer ceramic capacitor by using an algorithm of a computing device comprising a memory and processor to determine electric field lines and equipotential lines. Optimum capacitance of the capacitor may be achieved when density of field lines is as nearly uniform as possible, which can be exploited through the algorithm. For example, the above-discussed bulbous ends of a conductive layer end may reduce separation of the layers due to a bulbous end comprising a higher thickness. The algorithm may precisely space and orientate the bulbous ends such that the most separation is achieved to reduce the field lines, which maximizes capacitance of the MLCC.

In addition, the base metal layer and/or the cladded noble metal layer of a conductive layer may be of any thickness, preferably with the base metal layer comprising a higher thickness than a noble metal layer, and may be adjusted based on optimal operating efficiency of the MLCC, which may be computed by the algorithm. In general, the noble metal layer of each conductive layer may be of minimal thickness, while also ensuring that there is a solid separation between base metal layer and dielectric layer, although the present invention is not so limited and permeation of the base metal layer may be achieved, if desired.

BRIEF DESCRIPTION OF THE DRAWINGS

Example embodiments are illustrated by way of example and are not limited to the figures of the accompanying drawings, in which, like references indicate similar elements.

DETAILED DESCRIPTION

Disclosed are methods and systems for material cladding of MLCCs. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

A capacitor is an electrical device that stores energy in the electric field between a pair of closely spaced conductors. Capacitors may be used as energy-storage devices, and may also be used to differentiate between high-frequency and low-frequency signals. Capacitance value may be defined as a measure of how much charge a capacitor can store at a certain voltage.

Figure 1:
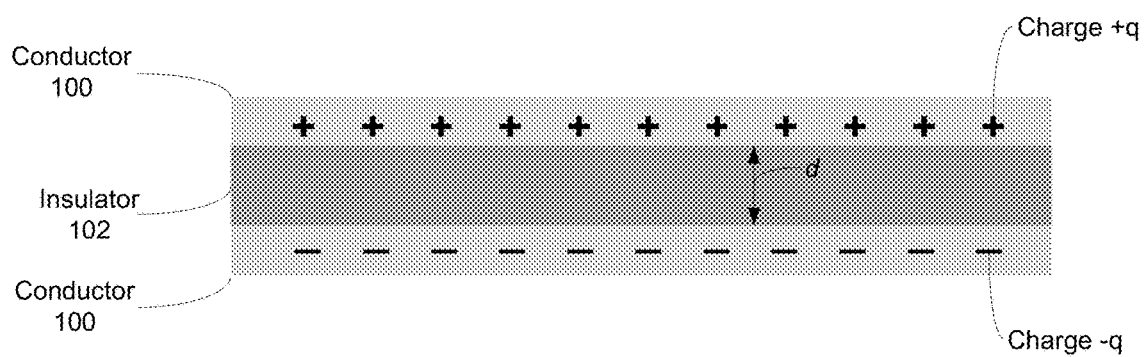
FIG. 1 is a cross-section view of an example plate capacitor.

FIG. 1 is a cross-section view of an example plate capacitor. A capacitor may comprise two conductor 100 (electrodes) separated by insulator 102. The plate capacitor may be manufactured from three parallel plates. If the plates have an area, A, that is separated by a distance d as shown, then the capacitance, C, can be expressed as the formula:

$$C = \frac{\kappa \epsilon_0 A}{d}$$

where $\kappa$ is the ratio of the insulator permittivity to that of a vacuum (sometimes called the dielectric constant of the material), and $\epsilon_0$ is the permittivity of a vacuum. The formula may be inexact due to edge effects: at the border of the parallel plates, the electric field bulges away from the capacitor. If the plate size is large relative to separation d, the edge effect is negligible.

Figure 2:
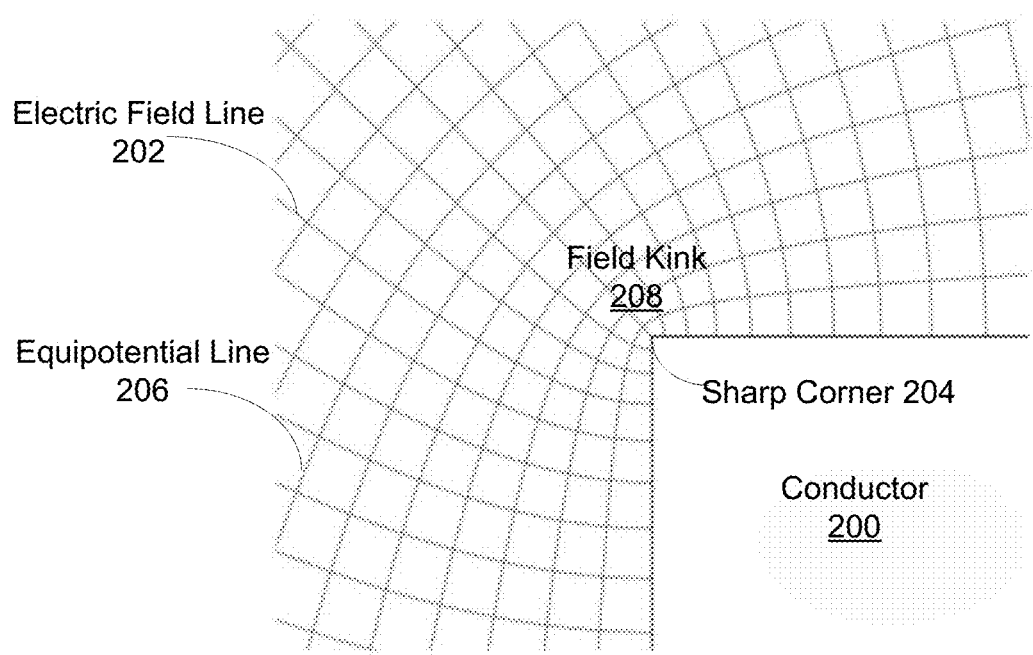
FIG. 2 shows the equipotential lines and electric field lines near a corner of a charged conductor.

FIG. 2 shows the equipotential lines and electric field lines near a corner of a charged conductor. Electric field line 202 may be normal to the surface of conductor 200, which can be of a high intensity near sharp corner 204, resulting in an electric field kink 208. Equipotential line 206 may be parallel to the conductor surface and at a right angle to electric field line 202. Since a capacitor may experience breakdown when the electric field exceeds a certain threshold level, sharp corner 204 may limit the maximum voltage to which the capacitor can be charged. If V is the maximum voltage, then the energy E that a capacitor can hold is given by the formula:

$$E=\tfrac{1}{2}CV^2$$

Since a use of capacitors is to store energy, anything that can increase the maximum voltage may be desirable since the energy may increase as the square of the voltage; however, exceeding the maximum voltage may cause a miniature lightning strike through the insulator that can render the capacitor inoperable.

A multilayer ceramic capacitor (MLCC) may be a device made of ceramic and metal that alternate to make a multilayer chip. The capacitance value of an MLCC may be determined by several factors, such as geometry of the part, e.g., shape and size, and total active area. The dielectric constant, κ, may be determined by the ceramic material. The total active area may be the overlap between two opposing electrodes. A thickness of the dielectric ceramic material may be inversely proportional to the capacitance value such that the thicker the dielectric, the lower the capacitance value. This may also determine the voltage rating, with a thicker dielectric layer comprises a higher voltage rating that a thinner one.

Figure 3:
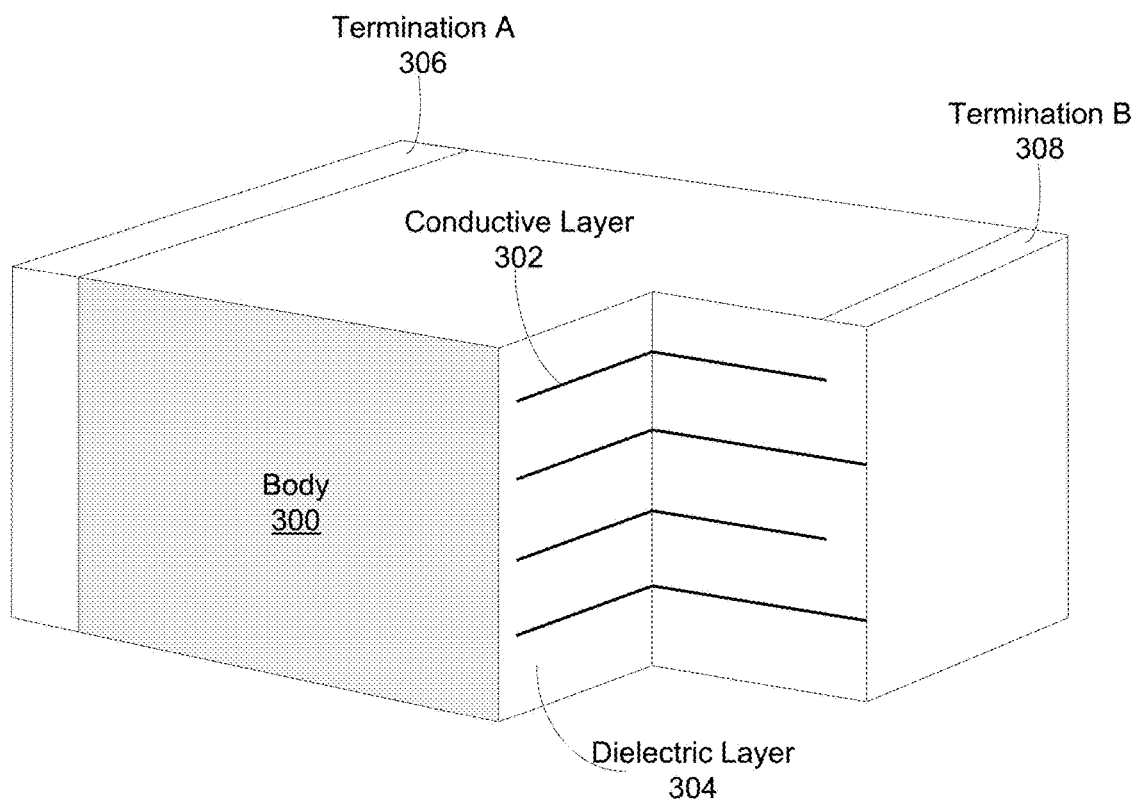
FIG. 3 is a cutaway perspective view of a conventional multilayer ceramic capacitor.

FIG. 3 is a cutaway perspective view of a conventional multilayer ceramic capacitor. The MLCC may comprise a laminated cube-shaped body 300 having alternately stacked conductive layer 302 and ceramic dielectric layer 304, and a pair of external termination A 306 and termination B 308 positioned at two opposite end portions of the body 300. The conductive layer 302 may be made from a noble metal and/or a base metal, e.g., copper, and nickel, silver, palladium, gold, and platinum. The dielectric layer 304 may be made from ceramic material comprising barium titanate.

A plurality of conductive layer 302 may be alternately connected to termination A 306 and termination B 308, such that termination A 306 is connected to every second conductive layer 302, and termination B 308 is connected with the remaining conductive layer 302 not connected to termination A 306. Conductive layer 302 and dielectric layer 304 may have flat surfaces, and the thickness of conductive layer 302 may be spatially uniform, e.g., same height. When a voltage is applied to termination A 306 and termination B 308, the MLCC may produce electric fields between every two neighboring conductive layer 302 and store electric charges therein.

Figure 4:
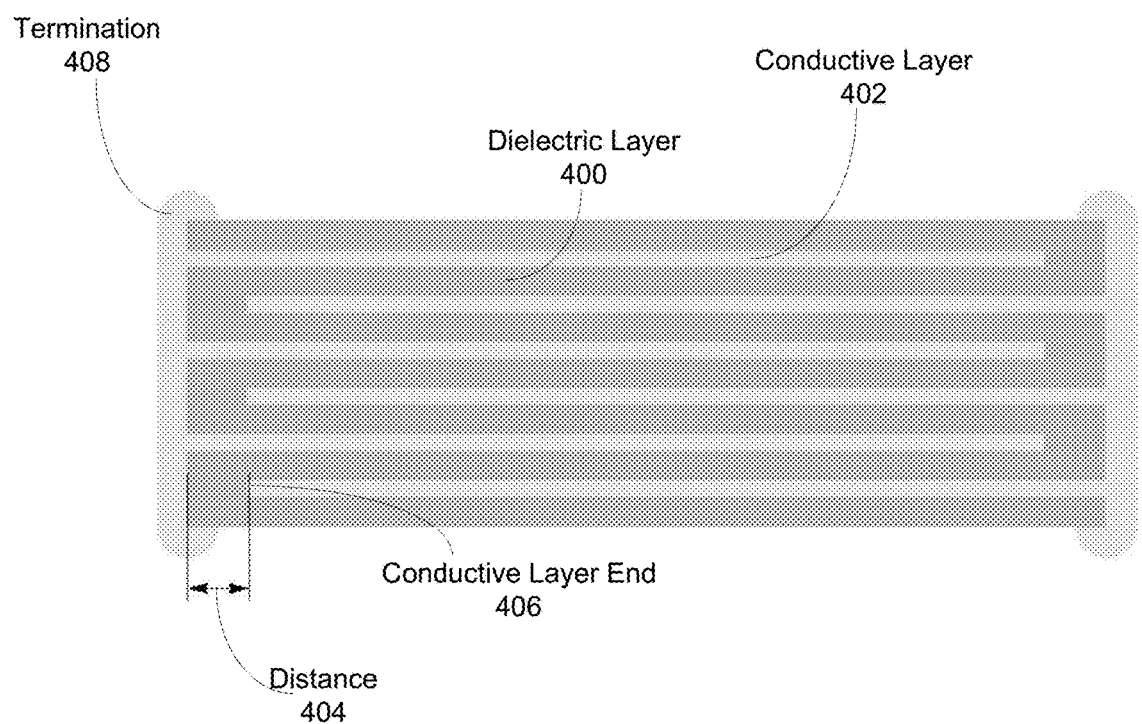
FIG. 4 is a schematic representation of a front cross-section view of a conventional multilayer ceramic capacitor.

FIG. 4 is a schematic representation of a front cross-section view of a conventional multilayer ceramic capacitor. Dielectric layer 400 and conductive layer 402 may be several microns thick, and distance 404 between a non-connecting conductive layer end 406 and a corresponding surface of termination 408 that is coupled to the capacitor's body may b e no less than 500 microns due to the imprecise nature of prior art manufacturing processes.

Multilayer ceramic capacitors have traditionally been made by forming a tape from insulating ceramic slurry, printing conductive ink layers, pressing the layers together, and then sintering to form a laminated alternation of insulator and conductor. However, particularly in the case of a physically large MLCC, there is a possibility of delamination under the stress of temperature or pressure. If a layer separates, even slightly, there is a drop in the capacitance that can render it out of specification, or there can be complete device failure. In addition, the process may be limited to simple flat layers and complex shapes may not be possible, such as to avoid sharp corners that can cause voltage breakdown.

In at least one embodiment, the present invention discloses a system and a method to improve a ceramic capacitor using additive manufacturing, e.g., 3D Printing, where ink or aerosol jets deposit material such as, e.g., ceramic slurry, conductive ink, ferrite paste, and carbon resistor paste onto a surface. The aforementioned materials can be sintered at high temperatures, and therefore are amenable to integrated manufacture. Compared with traditional methods, this process may be inherently more precise and repeatable, has much higher geometric and spatial resolutions, and produces higher density components with less material waste. In addition, a key advantage for purposes of this invention is that more complex shapes that were not possible before can now be printed, which can be used to improve specification and/or structural integrity of the product.

Figure 5:
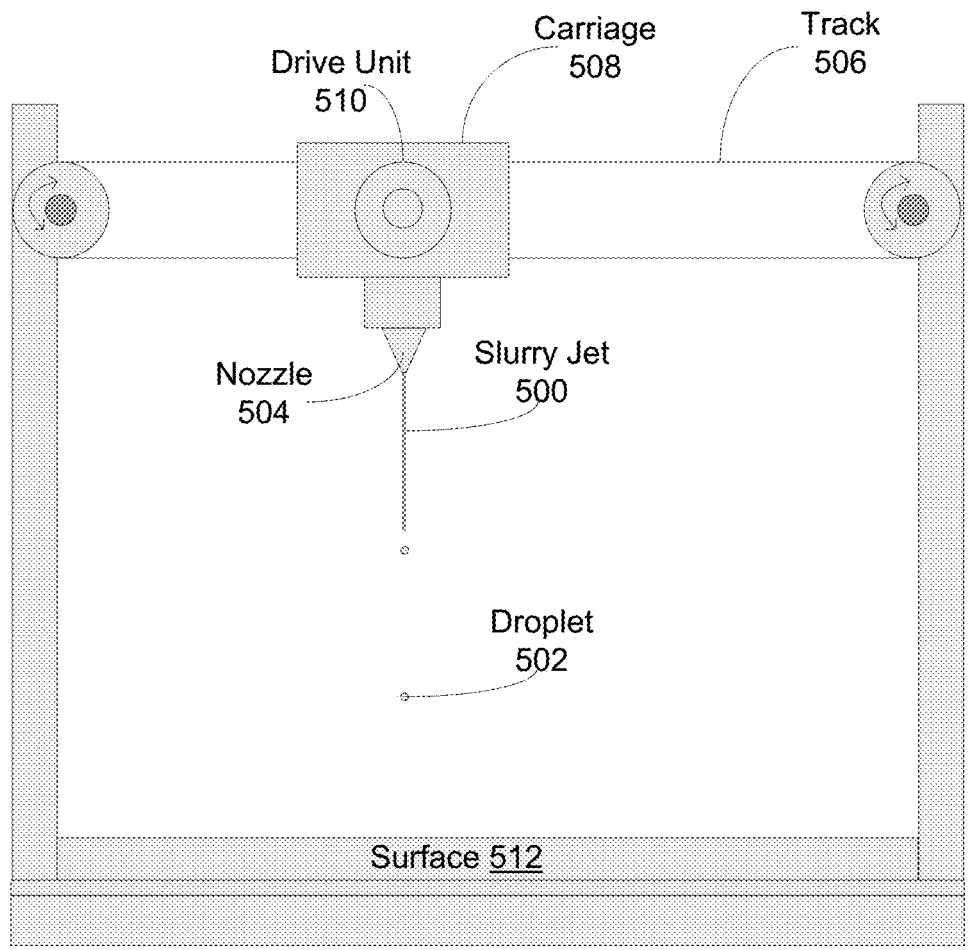
FIG. 5 is a system of a drop-on-demand type additive printer that may be used to implement one or more embodiments of the present invention.

FIG. 5 is a system of a drop-on-demand type additive printer that may be used to implement one or more embodiments of the present invention. A slurry jet 500 may be dispensed from a nozzle 504 having an orifice comprising an opening, and may be raster or vector scanned on track 506 by a carriage 508 driven by drive unit 510 over a surface 512 or on top of an already formed powder bed to define a new layer. Pressure may be used to force the slurry out of the nozzle and into a continuous stream of slurry jet 500 and/or as droplet 502, which may be defined as a breakup of the flow. A layer surface height measurement unit, such as, e.g., a laser rangefinder may be used to receive an input signal to control the height of the surface that is formed by varying the delivery of slurry.

A typical implementation of an additive manufacturing process begins with defining a three-dimensional geometry of the product using computer-aided design (CAD) software. This CAD data is then processed with software that slices the model into a plurality of thin layers, which are essentially two-dimensional. A physical part is then created by the successive printing of these layers to recreate the desired geometry. This process is repeated until all the layers have been printed. Typically, the resulting part is a "green" part, which may be an unfinished product that can undergo further processing, e.g., sintering. The green part may be dense and substantially non-porous.

Figure 6:
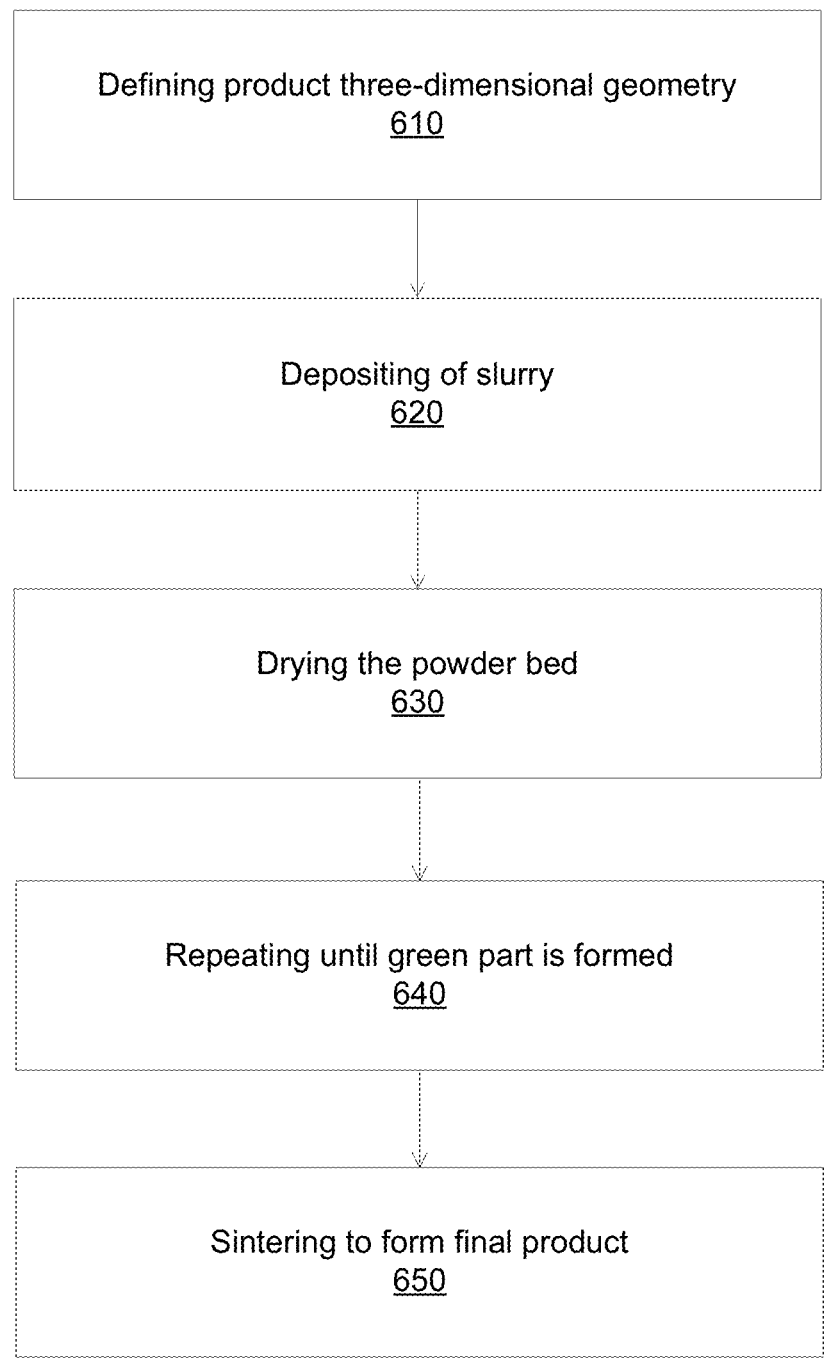
FIG. 6 is a flow diagram of a method of an additive printing process that may be implemented with one or more embodiments of the present invention.

FIG. 6 is a flow diagram of a method of an additive printing process that may be implemented with one or more embodiments of the present invention. Operation 610 defines a final product's three-dimensional geometry using CAD software. In operation 620 deposits layers of slurry comprising powder material and binder onto a surface or on top of a powder bed, which then slip-casts to make a new layer. As the slurry deposits in each two dimensional layer, the printer may select insulator or conductor as the material type, in separate passes or as a combined pass. The slurry may be deposited in any suitable manner, including depositing in separate, distinct lines, e.g., by raster or vector scanning, by a plurality of simultaneous jets that coalesce before the liquid slip-casts into the bed, or by individual drops. The deposit of slurry drops may be individually controlled, thereby generating a regular surface for each layer. Operation 630 dries any liquid from the powder bed, e.g., infrared flash-dry, after deposition of each layer. Operation 640 repeats operations 620 and 630 until a green part is formed. Operation 650 sinters the green part to form a final product. Sintering is a solid-state diffusion process that may be enhanced by increasing the surface area to volume ratio of the powder in any green part that is subsequently sintered.

In at least one embodiment, the present invention discloses base metal cladded with noble metals for material cost reduction and shape adjustment flexibility of MLCCs. Conductors of a capacitor can be made with expensive noble metals, e.g., silver, palladium, gold, or platinum, which have little affinity for oxygen or nitrogen, or with less expensive base metals, e.g., copper or nickel. Ceramic insulators (dielectric layers) are typically oxides or nitrides such as barium titanate ($BaTiO_3$). If an MLCC made with base metals experiences high temperatures, even briefly—such as when being soldered into a device—the conductors can react chemically with the ceramic and alter the specifications of the capacitor at best or ruin it at worst. Even at room temperatures, base metals will slowly react chemically with the ceramics and shorten the useful lifetime of the capacitor. Since noble metals are many times more expensive than base metals, the choice of conductor material in capacitor design presents a tradeoff between performance (longevity, temperature tolerance) and affordability.

In the present invention, conductive layers can be made with base metals and cladded with noble metals to lower costs without the tendency of base metal atoms combining with oxygen atoms in the dielectric material (which spoils the capacitor, especially if operated at high temperatures). In conjunction with computer modeling of Laplace's equation, the conductive layers can be reshaped at little material cost to make the electric field nearly uniform. The present invention reduces the cost of an MLCC without the degradation of performance associated with conductors made entirely of base metals; it further increases the design flexibility, which makes it more practical to use techniques that increase both the capacitance and maximum voltage for a given form factor.

Figure 7A:
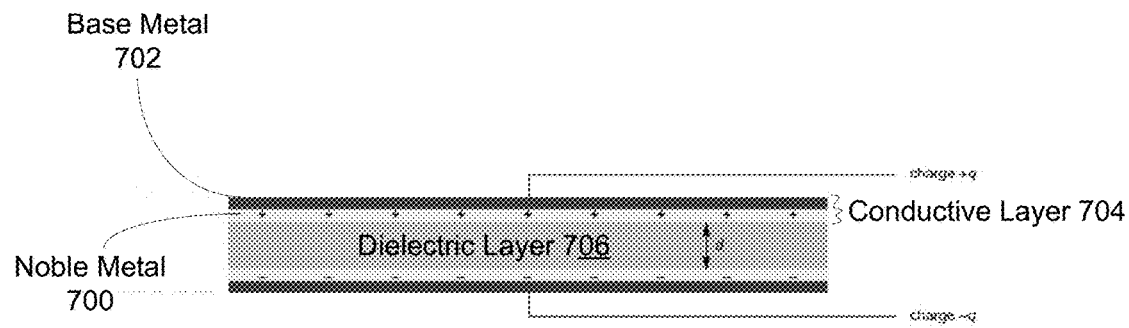
FIGS. 7A-B show cladding of base metals with noble metals to reduce material cost, according to at least one embodiment.
Figure 7B:
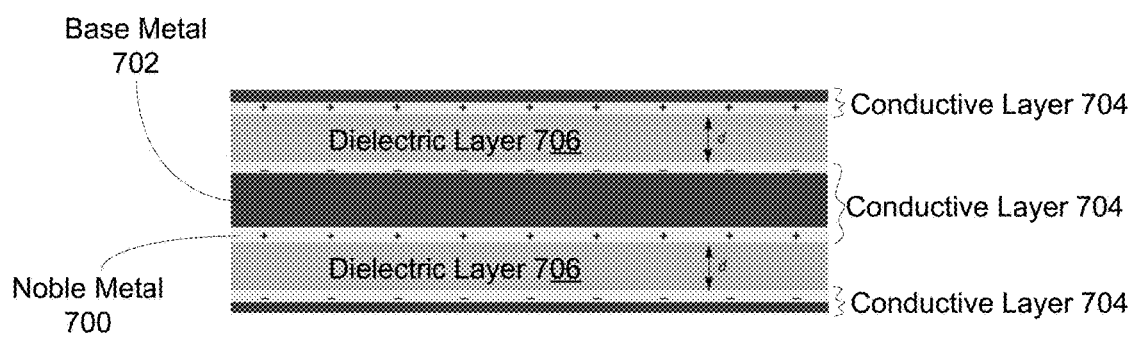

FIGS. 7A-B show cladding of base metals with noble metals to reduce material cost, according to at least one embodiment. FIG. 7A shows how 3D printing can greatly reduce the need for precious noble metal 700 without sacrificing its superior specifications by cladding base metal 702 with noble metal 700 in conductive layer 704 of an MLCC. Suppose the electrode (conductor) area in contact with the dielectric layer 706 represent a noble metal 700 material; we now introduce a base metal 702 as a voxel type in the 3D printing capability, represented as the exterior layers in the figure. FIG. 7A is a modification to the plate capacitors of FIG. 4, which may be made from either a noble metal or a base metal. Since the base metal 702 is physically separated from dielectric layer 706, it cannot chemically interact with it and degrade capacitor lifetime or temperature resilience. The nanoscale precision of 3D printing allows creation of a noble metal 700 conductor layer of minimal thickness needed to prevent diffusion and chemical reactions between base metal 702 and dielectric layer 706. For example, a layer may be just a few nanometers thick, e.g., 1-9, which may be sufficient to prevent chemical interactions. A few atoms, e.g., 1-9, of noble metal may be all that is needed for such a separation, and making it a few nanometers (tens of atoms) helps to assure that there are no holes, defects, or permeations that prevent base metal 702 being completely separated from dielectric layer 9706. However, standard or outdated 3D printers may lack such precision, and may be using as little as a single voxel of thickness, depending on the defect rate in the voxel deposition, for the separation. In addition, the thickness of base metal 702 may be larger than the thickness of noble metal 700 in order to efficiently reduce MLCC production cost.

FIG. 7B illustrates an MLCC comprising two dielectric layers separated by three conductive layers. Dielectric layers 706 contact only the noble metal 700 portions of conductive layers 704. The two conductive layers 704 positioned at either ends of a stack comprise exterior base metal 702 portions that are not in direct contact with a dielectric layer 706. The conductive layer 704 in the middle comprises two exterior noble metal 700 layers and a middle base metal 700 layer, and is thus completely cladded with noble metal. In contrast, the base metal 702 portions of the two conductive layers 704 positioned at either ends comprise only a single side lined with a noble metal and is not considered completely cladded with the noble metal. As such, FIG. 7B shows a plurality of conductive layers 704 comprising a base metal that alternates between a noble-metal-cladded structure and a non-noble-metal-cladded structure. The base metal 702 layer does not make contact with the insulator. The base metal 702 layer and/or the noble metal 700 layers may be of any thickness, preferably with the base metal 702 layer comprising a higher thickness than a noble metal 700 layer, and may be adjusted based on optimal operating efficiency of the MLCC, which may be computed by an algorithm. In general, the noble metal 700 layer of each conductive layer 704 may be of minimal thickness, while also ensuring that there is a solid separation of the base metal layer and the insulator. Any number of layers comprising base metal cladded with noble metal may be employed in an MLCC unit. There may be situations where a capacitor specification requires that conductive layers 704 of an MLCC alternate between comprising noble metal 700 cladding and non-noble metal 700 cladding. The non-noble metal 700 cladding layers may comprise either base metal 702 or noble metal 700.

In at least one embodiment, the present invention discloses improvements to a multilayer ceramic capacitor (MLCC). The capacitor may comprise a first conductive layer formed a surface, a dielectric layer formed on said first conductive layer and a second conductive layer formed on said dielectric layer, the method comprising the steps of depositing said first conductive layer on said surface, depositing said dielectric layer on said first conductive layer and depositing said second conductive layer on said dielectric layer. Each conductive layer may comprise of a base metal cladded with a noble metal, where the base metal does not make direct contact with said dielectric layer.

Figure 8:
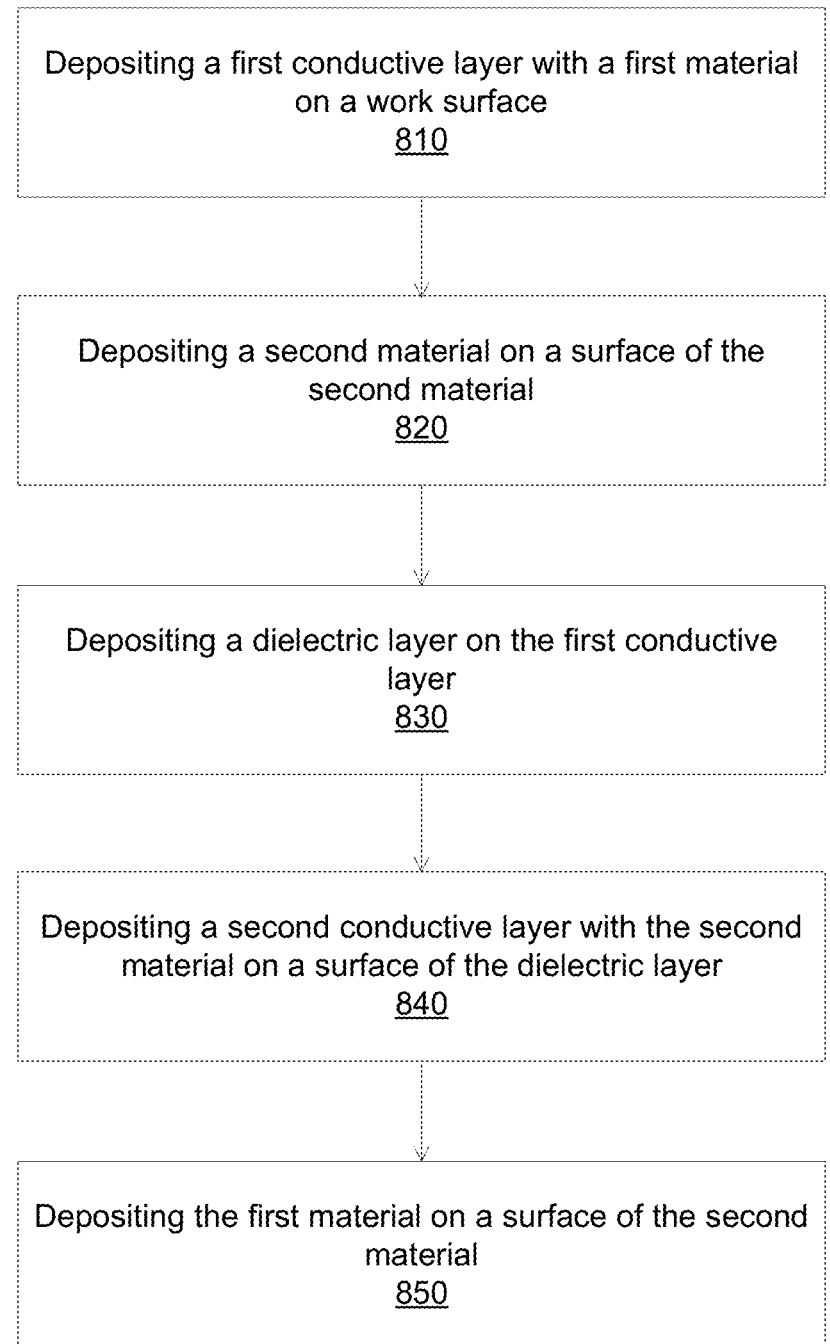
FIG. 8 is a flow diagram of a method of material cladding of MLCCs, according to at least one embodiment.

FIG. 8 is a flow diagram of a method of material cladding of MLCCs, according to at least one embodiment. Operation 810 deposits a first conductive layer with a first material on a work surface of a drop-on-demand system, such as the system illustrated in FIG. 5. The first material may be an inexpensive material, such as a base metal (e.g., copper, nickel, etc.). Operation 820 deposits a second material on a formed surfaced of the deposited first material. The second material may be a material possessing favorable qualities, such as a noble metal, e.g., silver or gold. Operation 830 deposits a dielectric layer on a surface of the second material of the first conductive layer. Operation 840 deposits a second conductive layer with the second material on a formed surface of the dielectric layer. Operation 850 deposits the first material on a formed surface of the second material of the second conductive layer. Preferably, the first material is kept completely separate from the dielectric layer, although the invention is not so limited and the first material may comprise holes or permeations.

Figure 9:
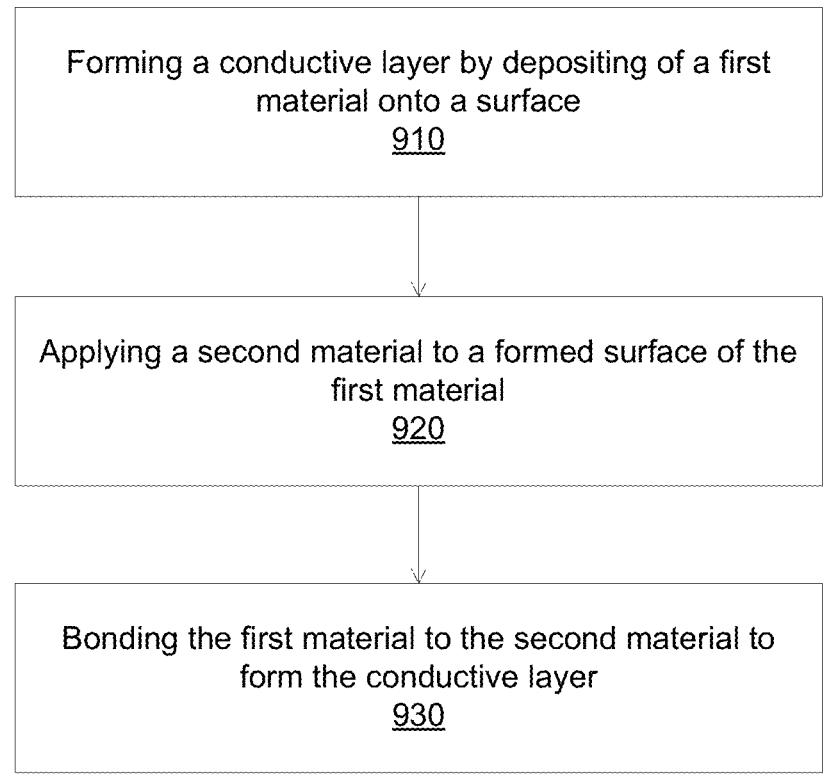
FIG. 9 is a flow diagram illustrating a process for material cladding of a conductive layer, according to at least one embodiment.

FIG. 9 is a flow diagram illustrating a process for material cladding of a conductive layer, according to at least one embodiment. Operation 910 forms a conductive layer by depositing a first powder material onto a work surface to form a first surface. The material slurry may be deposited in individually controlled drops. Operation 920 applies a second material to the formed surface of the first material. Operation 930 bonds the first material to the second material to form a conductive layer of an MLCC. The bonding of the first material to the second material may be performed by sintering of the first material to the second material. The first material may be a base metal, and the second material may be a noble metal. In some embodiments, inexpensive base metal may be added at specific, localized areas of the conductive layer. This localized area may be any area that comprises sharp corners or angles, thus minimizing or eliminating capacitance- and efficiency-reducing 'hot spots.' The addition of material may follow the general shape and flow of the localized area to avoid sharp edges or corners, e.g., following a wavy pattern. Generally, angles of above 90-degrees may be desirable, and material may be added to angles and corners of 90-degrees or less to achieve desirable angles. The thickening or thinning of specific portions of the conductive layer through the adjustment of base metal thickness may change the shape of the conductive layer, which in turn may directly impact capacitance of the capacitor.

In at least one embodiment, the present invention discloses reshaping of conductive layers and termination caps of MLCCs through noble metal cladding of base metals and/or manipulation of base metal layers. In terms of electrostatic behavior, the shape of the conductive layers is much less important than the shape of the dielectric layers. In conductors, electrons exhibit the "skin effect." Like charges repel, so the electrons seek the maximum distance from one another as they travel in a conductor; this leads them to cling to the outermost border of a conductive shape. In a conductor, the electrostatic potential at the surface is constant, no matter the shape. The reshaping and/or cladding of conductive layers and termination caps of MLCCs can be done using inexpensive base metals, instead of requiring noble metals to establish rounded interior corners and other modifications.

Figures 10A, 10B, 10C:
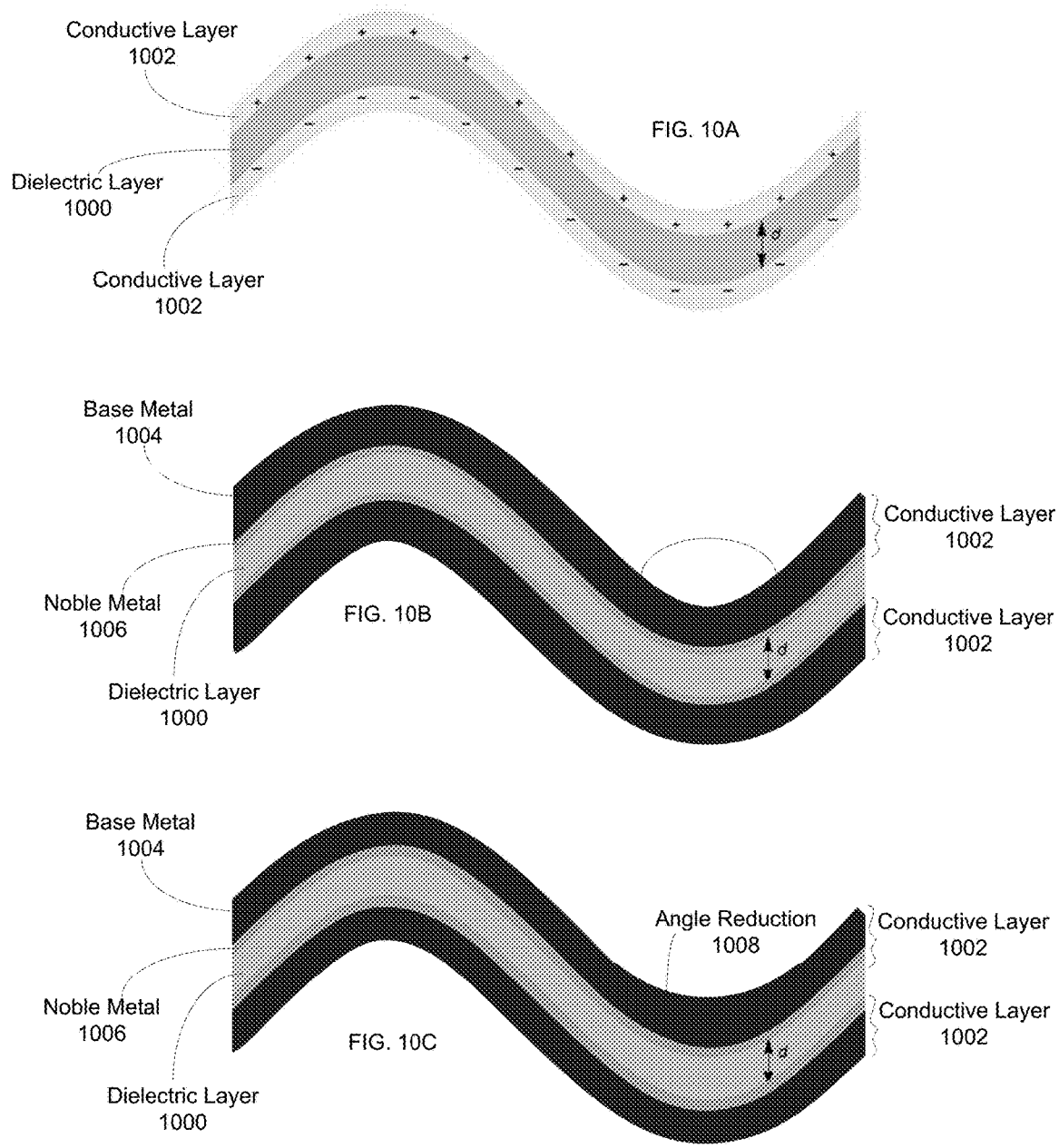
FIGS. 10A-C illustrate implementations of base metal cladding with noble metals to alter shapes of MLCC layers, according to at least one embodiment.

FIGS. 10A-C illustrate implementations of base metal cladding with noble metals to alter shapes of MLCC layers, according to at least one embodiment. Consider the sinusoidal electrode of FIG. 10A, as introduced in U.S. Provisional Patent Application No. 62/194,256, with a filing date of Jul. 19, 2015, entitled, "Methods and systems for increasing capacitance of multi-layer ceramic capacitors", which is incorporated herein in its entirety for all purposes. The electric potential may be higher where the surface has the highest curvature. To prevent "hot spots" or "cold spots" from forming in the geometrical design, dielectric layer 1000 can be made thicker or thinner, in exchange for a change in the shape of conductive layer 1002. The change in the shape of conductive layer 1002, in turn, can be made with little consequence to the overall cost of materials since the bulk of conductive layer 1002 can be made of base metal with noble metals only used as cladding. FIG. 10B shows a sinusoidal conductive layer 1002 made from base metal layer 1004 and cladded with noble metal layer 1006 for separation of the base metal layer 1004 and the dielectric layer 1000. Dielectric layer 1000 contacts only the noble metal 1006 portion of conductive layer 1002, which prevent diffusion and chemical reactions between base metal 1004 and dielectric layer 1000. The base metal layer 1004 may be of any thickness, and may be adjusted based on optimal operating efficiency of the MLCC, which may be computed by an algorithm. The thickening or thinning of specific portions of conductive layer 1002 through the adjustment of base metal 1004 thickness may change the shape of the conductive layer 1002, which in turn may directly impact capacitance of the capacitor. In general, the noble metal layer 1006 of each conductive layer 1002 may be of minimal thickness, while also ensuring that there is a solid separation between base metal layer 1004 and dielectric layer 1000. The noble metal layer 1006 thickness may also be optimized by an algorithm.

FIG. 10C is a sinusoidal conductive layer that has a sharp angle reduced at one of its curvatures. Through drop-on-demand printing, it may be possible to add material, such as inexpensive base metal 1004 at specific, localized areas on conductive layer 1002. This localized area may be any area that comprises sharp corners or angles, thus minimizing or eliminating capacitance- and efficiency-reducing 'hot spots.' The addition of material may follow the general shape and flow of the localized area to avoid sharp edges or corners (e.g., following a wavy pattern), such as seen at angle reduction 1008. Generally, angles of above 90-degrees may be desirable, and material may be added to angles and corners of 90-degrees or less to achieve desirable angles.

Figure 11A:
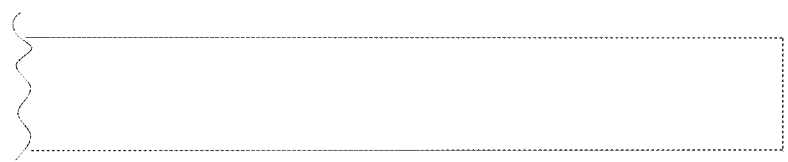
FIGS. 11A-E illustrate implementations of base metal cladding with noble metals of various conductive layer ends, according to at least one embodiment.
Figure 11B:
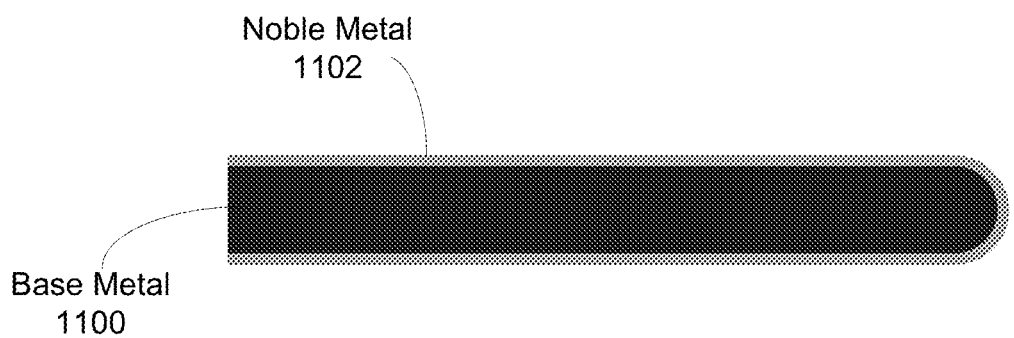

FIGS. 11A-E illustrate implementations of base metal cladding with noble metals of various conductive layer ends, according to at least one embodiment. FIG. 11A is a standard conductive layer endpoint of an MLCC. Sharp corners present in the standard endpoint produces unwanted 'hot spots' that lowers maximum operating voltage. FIG. 11B introduces a novel round-shape endpoint of a conductive layer, as shown and described in U.S. Provisional Patent Application No. 62/211,792, with a filing date of Aug. 30, 2015 entitled, "Methods and systems for geometric optimization of multi-layer ceramic capacitors", which is incorporated herein in its entirety for all purposes. The rounded endpoint may be made from a base metal layer 1100 and cladded with a noble metal layer 1102. The round shape is enabled by the precision of the method of drop-on-demand printing discussed above, which eliminates sharp corners and allows for maximum capacitance efficiency.

Figure 11C:
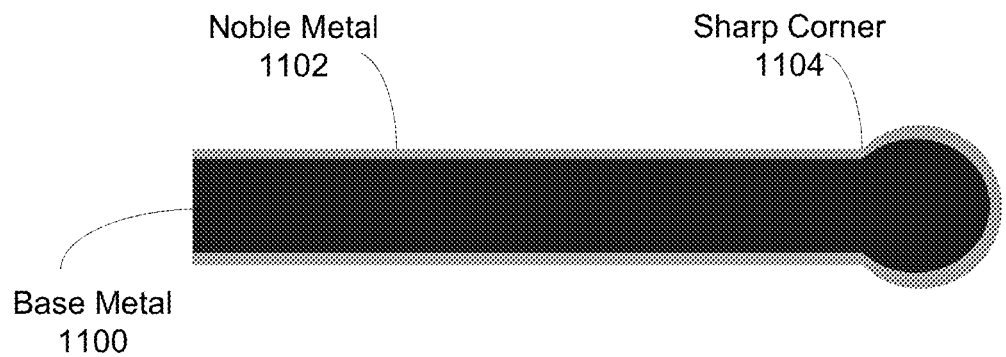
Figure 11D:
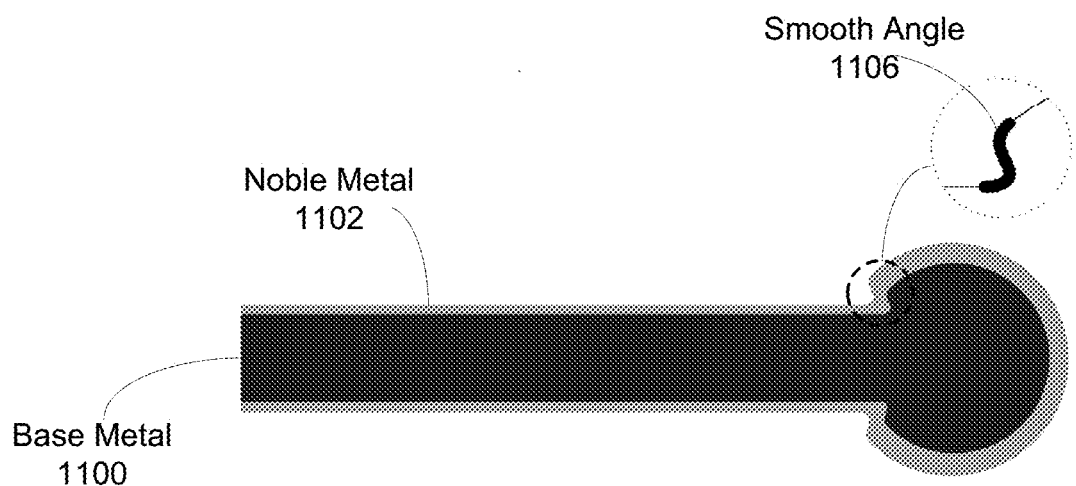
Figure 11E:
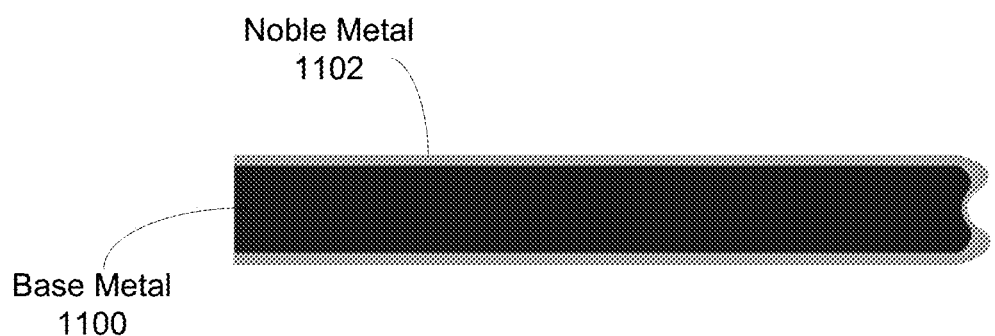

FIG. 11C is a conductive layer endpoint comprising a bulbous shape that is made from a base metal and cladded with a noble metal layer. The bulbous shape endpoint may comprise a wide-angle (e.g., greater than 90-degrees) sharp corner 1104 at the end of the bulb compared to the standard endpoint of FIG. 11A, which comprises a 90-degree sharp corner, and thus improves efficiency over the prior art. In FIG. 11D, sharp corner 1104 of FIG. 11C is further modified to comprise smooth angle 1106 that may structurally resemble the letter "S", which eliminates unwanted sharp corners from the bulb configuration. The bulbous end of the present figure may resemble a mushroom shape, and may also comprise of base metal 1100 cladded with noble metal 1102. In FIG. 11E, the conductive layer end is modified into wavy end 912. The wavy end of the present figure may differ from the round end of FIG. 11B due to comprising two or more crests and one or more trough. The wavy end also comprise base metal 1100 cladded with noble metal 1102, and may also be absent of any sharp corner.

The cladding of the base metal 1100 with noble metal 1102 may be employed to reduce material cost by substituting expensive noble metal 1102 with base metal 1100. A juxtaposed dielectric layer contacts only the noble metal portion 1102 of the conductive layer, which prevent diffusion and chemical reactions between base metal 1100 and the dielectric layer. The base metal layer 1100 may be of any thickness, and may be adjusted based on optimal operating efficiency of the MLCC, which may be computed by an algorithm. In general, the noble metal layer 1102 of each conductive layer may be of minimal thickness, while also ensuring that there is a solid separation between the base metal layer 1100 and the conductive layer. The thickness of noble metal layer 1102 may also be optimized by an algorithm.

Other shapes and configurations of conductive layer ends may be within the scope of the present invention. For example, the conductive layer ends of FIGS. 11A-E may comprise wave-like structures (or secondary wave-like structures in FIG. 11E) that increase surface area while still void, or minimizes the effect, of sharp corners and edges. Further, the wave-like structures may comprise secondary (or tertiary wave-like structures in FIG. 11E) to further increase surface area. The precision of the method and system of the present invention allows for such complex geometries to be produced in an MLCC, which in turn allows for maximum control and adjustment of capacitor specification that was not possible before.

In some embodiments, terminations of an MLCC, such as seen in FIG. 3 may also be made from a base metal and cladded with a noble metal. At high temperatures, the terminations may oxidize and degrade, but cladding them can greatly reduce that tendency. Base metal cladding with noble metals in termination caps may also be used to separate base metal from dielectric layers, similar to the cladding of conductive layers discussed above. When a termination is cladded with a noble metal, the only surface that may not be cladded with the noble metal may be the surface that is in direct contact with the MLCC body, such that all exposed surfaces of the termination is cladded with the noble metal. In other embodiments, the only surface of a termination that is cladded with a noble metal is the surface that would be in contact with a connection of a chip or integrated chip to minimize production cost.

Figure 12:
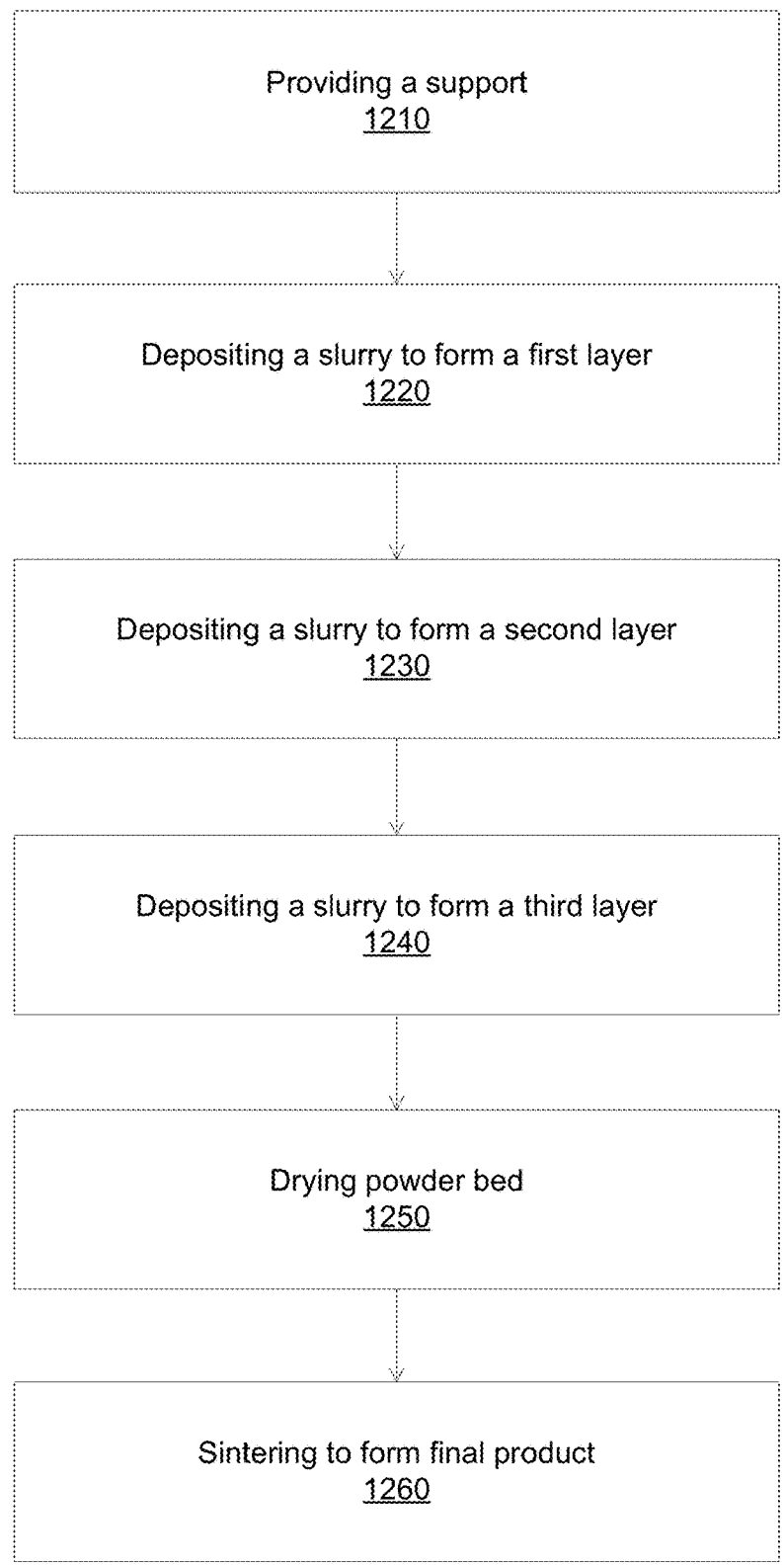
FIG. 12 is a flow diagram of a method of additive manufacturing that may be implemented in one or more embodiments of the present invention.

FIG. 12 is a flow diagram of a method of additive manufacturing that may be implemented in one or more embodiments of the present invention. Operation 1210 provides a support over a selected area. Operation 1220 deposits liquid slurry to form a first layer comprising conductive metal, such as, e.g., copper, nickel, silver, palladium, gold, and/or platinum. The slurry may be deposited as continuous parallel streams, or as individually controlled droplets, thereby generating a regular surface for each layer. Operation 1230 deposits liquid slurry to form a second layer comprising dielectric or ceramic material comprising barium titanate. Operation 1240 deposits liquid slurry to form a third layer. The third layer may comprise the same material as the first layer. The first and the third layers of the capacitor may comprise of a base metal cladded with a noble metal. Further, the first and the third layers of the capacitor may comprise a convex round and/or bulbous and/or wavy configuration disposed at the conductive layer end. The second layer may comprise a concave round or bulbous or wavy configuration disposed at the dielectric layer edge. In some embodiments, operation 1220 and operation 1230 sequentially repeat until a predetermined amount of alternating layers of conductor and dielectric material is achieved. Operation 1250 dries the powder bed by flash drying, e.g., infrared heating. Operation 1260 sinters the layers to form a final product.

Figure 13:
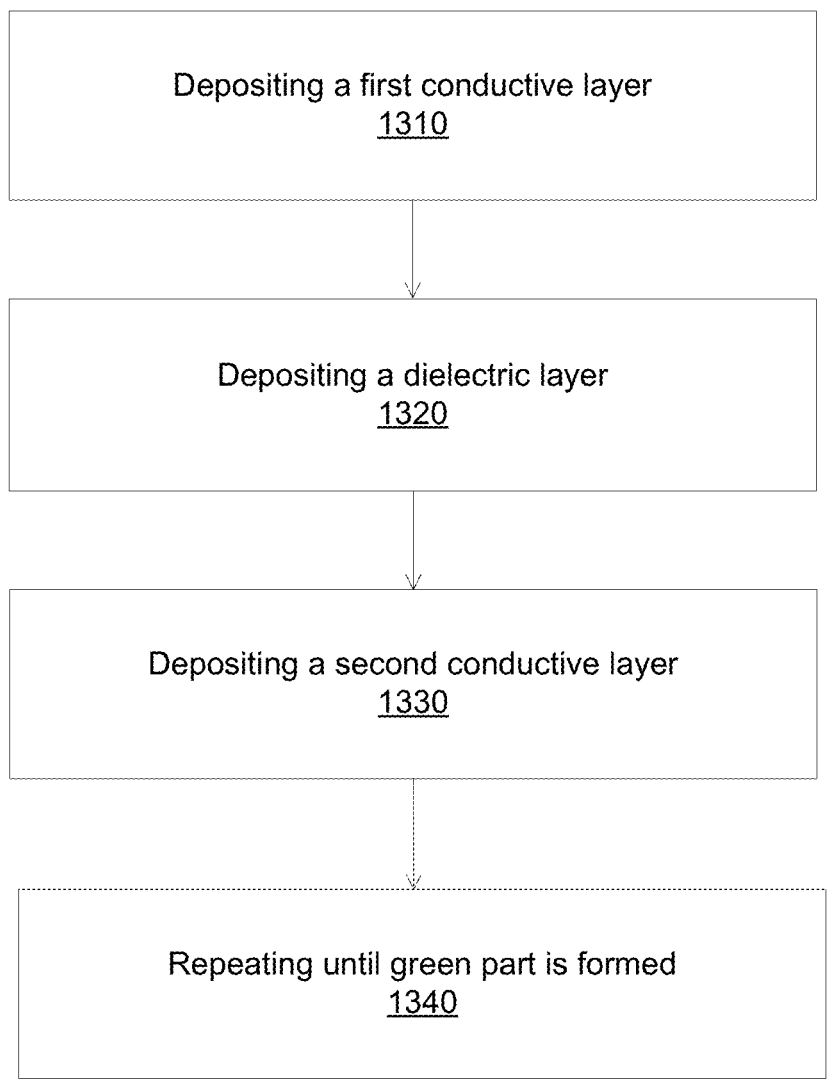
FIG. 13 is a flow diagram of another method of additive manufacturing that may be implemented in one or more embodiments of the present invention.

FIG. 13 is a flow diagram of another method of additive manufacturing that may be implemented in one or more embodiments of the present invention. Operation 1310 deposits a first conductive layer onto a surface. Operation 1320 deposits a dielectric layer on a top surface of the first conductive layer. Operation 1330 deposits a second conductive layer onto a top surface of the dielectric layer. Optionally, operation 1340 repeats operation 1320 and operation 1330 successively and sequentially such that the conductive layers and the dielectric layers alternate, and the conductive layers are disposed at both the bottom layer and the top layer, although in practice, the MLCCs may be manufactured with dielectric layers disposed at both the bottom layer and the top layer. The aforementioned steps may produce a ceramic capacitor comprising a first conductive layer formed on a surface of a dielectric layer, and a second conductive layer formed on the opposing surface of the dielectric layer. The first and the second conductive layers of the capacitor may comprise of a base metal cladded with a noble metal. Further, the first and the third layers of the capacitor may comprise a convex round and/or bulbous and/or wavy configuration disposed at the conductive layer end. The second layer may comprise a concave round or bulbous or wavy configuration disposed at the dielectric layer edge In at least one embodiment, the present invention discloses a system and a method for optimizing geometry of a multilayer ceramic capacitor by using an algorithm of a computing device comprising a memory and processor to determine electric field lines and equipotential lines. Optimum capacitance of the capacitor may be achieved when density of field lines is as nearly uniform as possible, which can be exploited through the algorithm. For example, the above-discussed bulbous ends of a conductive layer end may reduce separation of the layers due to a bulbous end comprising a higher thickness. The algorithm may precisely space and orientate the bulbous ends such that the most separation is achieved to reduce the field lines, which maximizes capacitance of the MLCC.

In addition, the base metal layer and/or the noble metal layer of a conductive layer may be of any thickness, preferably with the base metal layer comprising a higher thickness than a noble metal layer, and may be adjusted based on optimal operating efficiency of the MLCC, which may be computed by the algorithm. In general, the noble metal layer of each conductive layer may be of minimal thickness, while also ensuring that there is a solid separation between base metal layer and dielectric layer.

In some embodiments, computed solutions to Laplace's equation may dictate the thickness and geometry of conductive and/or dielectric layers, given as:

$$\nabla^2 \varphi = 0 \text{ or } \Delta\varphi = 0$$

where $\Delta = \nabla^2$ is the Laplace operator and $\varphi$ is a scalar function.

Figure 14:
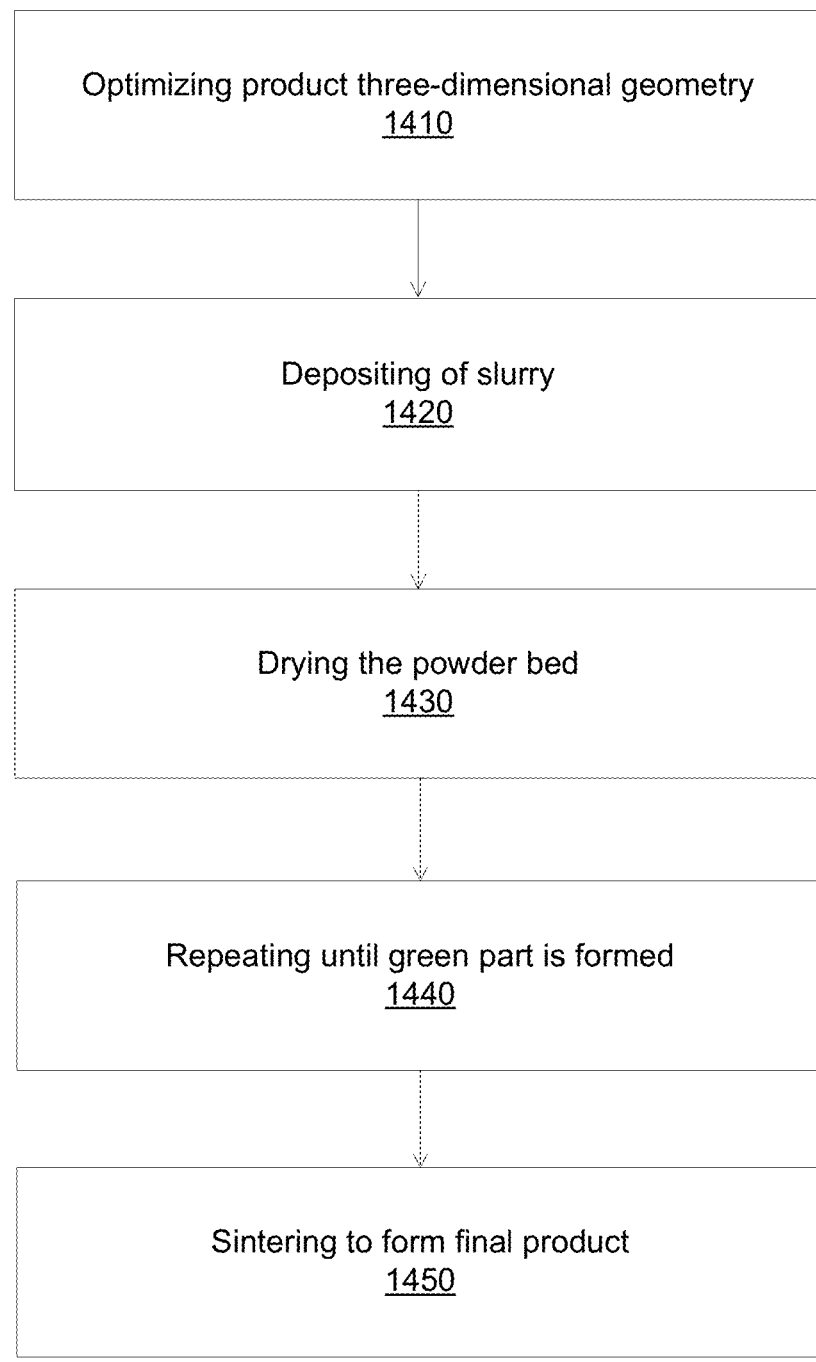
FIG. 14 is a flow diagram of a method of an additive printing process that may be implemented with one or more embodiments of the present invention.

FIG. 14 is a flow diagram of a method of an additive printing process that may be implemented with one or more embodiments of the present invention. Operation 1410 optimizes a final product's three-dimensional geometry using CAD software. An algorithm of a computing device may be used to maximize uniformity of electric field lines and equipotential lines to maximize capacitance of an MLCC. The algorithm may also optimize the thicknesses of a base metal layer and/or noble metal layer of a conductive layer to maximize capacitance and minimize production cost of the capacitor. In operation 1420 deposits layers of slurry comprising powder material and binder onto a surface or on top of a powder bed, which then slip-casts to make a new layer. As the slurry deposits in each two dimensional layer, the printer may select insulator or conductor as the material type, in separate passes or as a combined pass. The slurry may be deposited in any suitable manner, including depositing in separate, distinct lines, e.g., by raster or vector scanning, by a plurality of simultaneous jets that coalesce before the liquid slip-casts into the bed, or by individual drops. The deposit of slurry drops may be individually controlled, thereby generating a regular surface for each layer. Operation 1430 dries any liquid from the powder bed, e.g., infrared flash-dry, after deposition of each layer. Operation 1440 repeats operations 1420 and 1430 until a green part is formed. Operation 1450 sinters the green part to form a final product. Sintering is a solid-state diffusion process that may be enhanced by increasing the surface area to volume ratio of the powder in any green part that is subsequently sintered.

Figure 15:
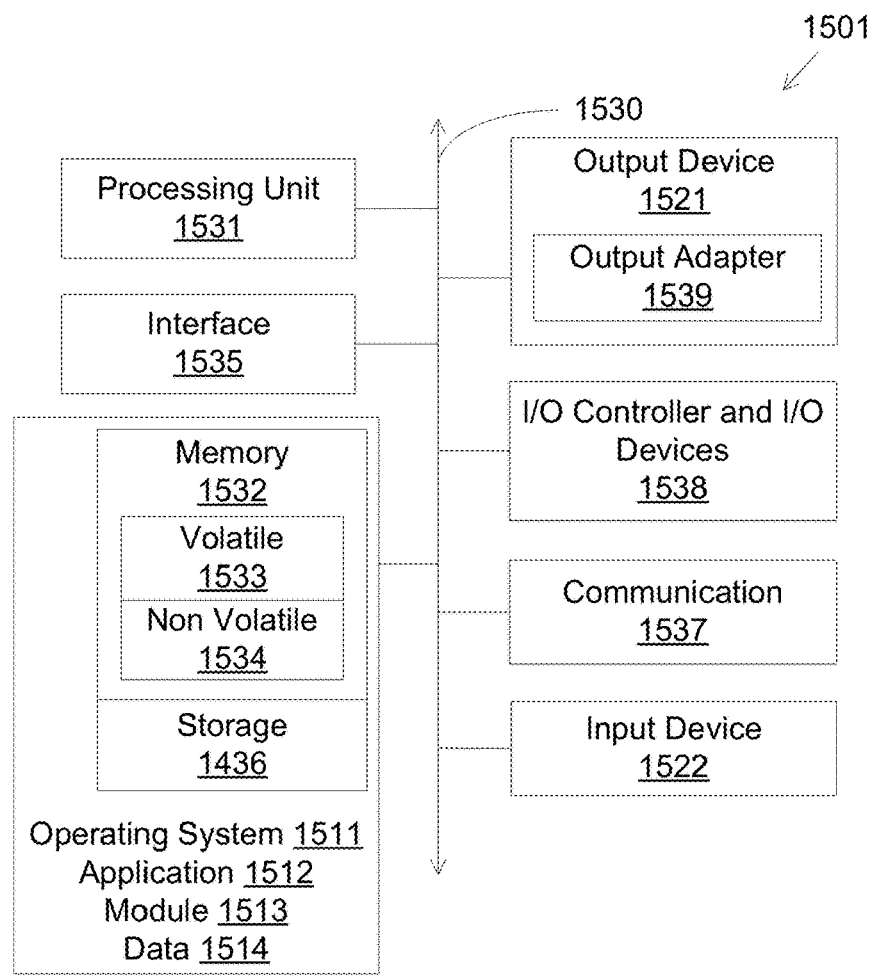
FIG. 15 illustrates a computing environment that may be used to implement one or more embodiments of the present invention.

FIG. 15 illustrates a computing environment that may be used to implement one or more embodiments of the present invention. An exemplary environment for implementing various aspects of the invention includes a computer 1501, comprising a processing unit 1531, a system memory 1532, and a system bus 1530. The processing unit 1531 may be any of various available processors, such as single microprocessor, dual microprocessors or other multiprocessor architectures. The system bus 1530 may be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCST).

The system memory 1532 may include volatile memory 1533 and nonvolatile memory 1534. Nonvolatile memory 1534 may include read only memory (ROM), programmable ROM (PROM), electrically programmable ROM (EPROM), electrically erasable ROM (EEPROM), or flash memory. Volatile memory 1533, may include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

Computer 1501 also includes storage media 1536, such as removable/nonremovable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface 1535 may be used to facilitate connection.

The computer system 1501 further may include software to operate in an environment, such as an operating system 1511, system applications 1512, program modules 1513 and program data 1514, which are stored either in system memory 1532 or on disk storage 1536. Various operating systems or combinations of operating systems may be used.

Input devices 1522 may be used to enter commands or data, and may include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 1538. Interface ports 1538 may include a serial port, a parallel port, a game port, a universal serial bus (USB), and a 1394 bus. The interface ports 1538 may also accommodate output devices 1521. For example, a USB port may be used to provide input to computer 1501 and to output information from computer 1501 to an output device 1521. Output adapter 14539, such as video or sound cards, is provided to connect to some output devices such as monitors, speakers, and printers.

Computer 1501 may operate in a networked environment with remote computers. The remote computers may comprise a memory storage device, and may be a personal computer, a server, a router, a network PC, a workstation, a microprocessor based appliance, a peer device or other common network node and the like, and typically includes many or all of the elements described relative to computer 1501. Remote computers may be connected to computer 1501 through a network interface and communication connection 1537, with wire or wireless connections. A network interface may be communication networks such as local-area networks (LAN), wide area networks (WAN) or wireless connection networks. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

Figure 16:
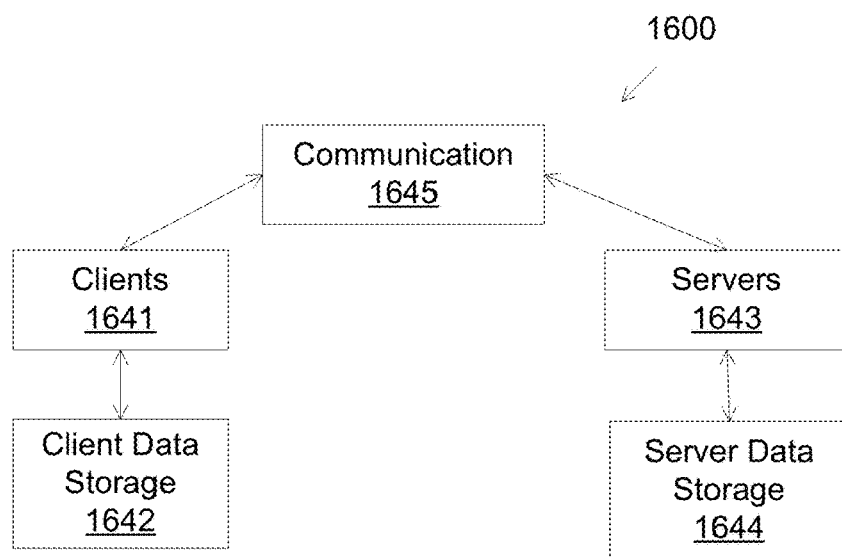
FIG. 16 is a schematic block diagram of a sample computing environment with which the present invention may interact.

FIG. 16 is a schematic block diagram of a sample computing environment 1600 with which the present invention may interact. The system 1640 includes a plurality of client systems 1641. The system also includes a plurality of servers 1643. The servers 1643 may be used to employ the present invention. The system includes a communication network 1645 to facilitate communications between the clients 1641 and the servers 1643. Client data storage 1642, connected to client system 1641, may store information locally. Similarly, the server 1643 may include server data storages 1644.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims. It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A multilayer ceramic capacitor, comprising:
 a ceramic body;
 one or more dielectric layers alternately stacked with two or more conductive layers, wherein the conductive layers comprising a base metal alternates between a noble-metal-cladded structure and a non-noble-metal-cladded structure.

2. The multilayer ceramic capacitor of claim 1, further comprising:
wherein a shape of the conductive layers is adjusted by a thickening or a thinning of a base metal portion.

* * * * *